United States Patent [19]

Courboulay et al.

[11] 3,861,585

[45] Jan. 21, 1975

[54] DEVICE FOR CARRYING OUT ARITHMETICAL AND LOGICAL OPERATIONS

[75] Inventors: Pierre Courboulay, Paris; Jacques Cretin, Le Chesnay; Francois Anceau, Gieres; Claude Beauducel, Franconville, all of France

[73] Assignee: Institut Francais Du Petrole Des Carburants Et Lubrifiants, Malmaison, France

[22] Filed: Mar. 2, 1973

[21] Appl. No.: 337,369

[30] Foreign Application Priority Data

Mar. 6, 1972 France .............................. 72.07787

[52] U.S. Cl. .................................. 235/164, 235/156

[51] Int. Cl. ............................................... G06f 7/39

[58] Field of Search ........... 235/152, 156, 164, 165, 235/166, 167

[56] References Cited

UNITED STATES PATENTS

| | | | |
|---|---|---|---|
| 3,069,085 | 12/1962 | Coopper et al. | 235/164 |
| 3,584,781 | 6/1971 | Edson | 235/156 |
| 3,641,331 | 2/1972 | Kreidermacher et al. | 235/156 X |
| 3,684,879 | 8/1972 | Koehler | 235/164 X |

*Primary Examiner*—Malcolm A. Morrison
*Assistant Examiner*—James F. Gottman
*Attorney, Agent, or Firm*—Craig & Antonelli

[57] ABSTRACT

A device for carrying out arithmetical and logical operations upon control of a microprogram. The device includes a plurality of registers for performing arithmetical operations, a decoder for decoding microinstructions issued from a microprogram, and control devices for controlling the utilization of the registers in accordance with decoded microinstructions for carrying out arithmetical and logical operations.

18 Claims, 3 Drawing Figures

PATENTED JAN 21 1975

SHEET 1 OF 3

3,861,585

DEVICE FOR CARRYING OUT ARITHMETICAL AND LOGICAL OPERATIONS

Figure 1:
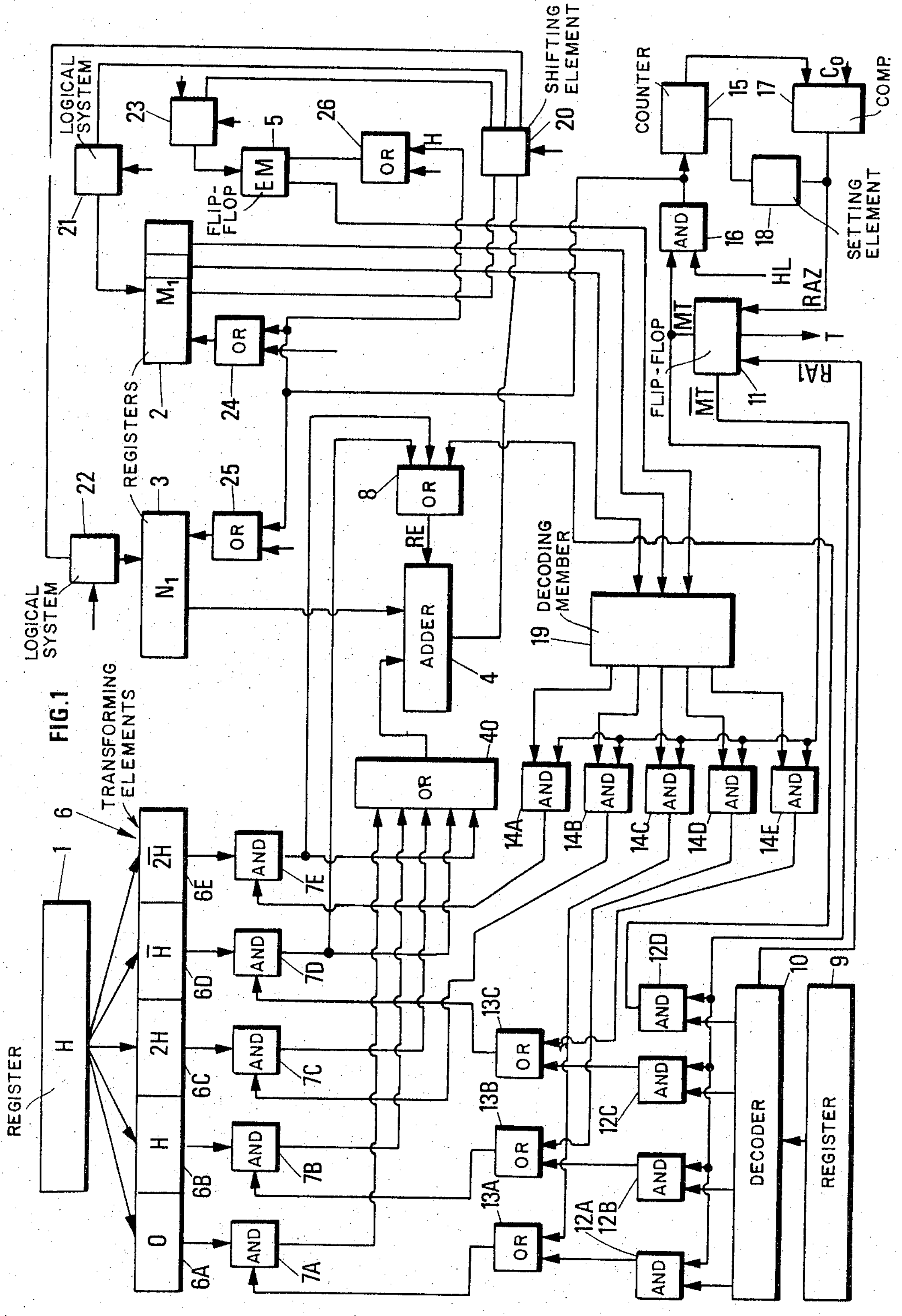

The present invention relates to a device for carrying out arithmetical and logical operations, which may be included in the structure of a digital computer.

More particularly, this device has the object of performing, in a self operating manner, multiplications of two operands, on the one hand, and a whole set of logical and digital operations controlled by a micro-program, on the other hand.

In the digital computers, the micro-programmation provides for the performance, by means of simple operators such as adding operators, of logical operations or even more complex operations such as multiplication or division for example, without requiring the use of special corresponding circuits. The performance of these operations however requires a great number of information exchanges between the control micro-program and the selected operators. Accordingly, the time required for carrying out these operations is greater than that necessary for a multiplier comprising completely wired circuits, used for the same purpose.

The wired multipliers have however the noticeable drawback of being formed by a circuit arrangement which is too specialized for being used, at least partly, for carrying out other operations.

The device according to this invention makes it possible to avoid the above-mentioned drawbacks. It consists of a circuit arrangement having the advantage of a very quick operation as it is the case for a wired multiplier and which may be used for less specialized operations.

More generally, the device comprises three registers, two of which being devoted to the operands to be processed in the course of a multiplying operation, the third register being used in conjunction with at least one of the two preceding registers, for retaining the partial result of an operation carried out with the two operands.

The partial summations are made by an adder. The successive operations are carried out in a known manner, by a succession of cycles comprising the test of the successive binary digits of the multiplier and the addition or substraction of the multiplicand to a partial result obtained during the preceding cycle and conveniently shifted towards the binary elements of lower weight of the register containing the multiplier and of the third register.

One of the remarkable features of the device consists in the fact that it comprises a switching system for changing over the orders issued from a micro-instruction. When a micro-instruction comprises an order of multiplying of two operands, the switching system connects the elements devoted to the multiplication to a control assembly ensuring the autonomous processing of the operations to be carried out. Other orders issued in the course of the multiplying operations are thus inhibited until the latter is completed.

When a micro-instruction comprises orders relating to other logical operations such as additions, standardizations of binary numbers, extractions of square roots, for example, the one or more operands are transferred into two registers which may be, as well as the adder, under the direct control of a micro-instruction decoding member, the autonomous processing system for multiplying operations being thus inhibited.

Another remarkable feature of the device consists in the fact that the adder and one of the registers used during the multiplying operation, for containing the high weight portion of a partial result, each comprises an additional binary element in excess of the normally used binary element devoted to the signs of the binary numbers. Connections are established between the additional binary element of the register and the element devoted to the sign of the same register, between the binary element of the sign of the adder and the additional binary element of the adder. Similarly, a system is provided for transferring to the additional binary element of the adder, the sign of a number deduced from one of the operands. These connections and this system make it possible according to the cases and under the control of convenient means, to maintain during the successive cycles the actual value of the sign of the partial results and of the operands. Another remarkable feature of the device consists in the fact that it comprises a system for testing and a system for normalizing the binary numbers, included in the adder and operated from the signals available at the outputs of three binary elements, one of which is the additional binary element, the two others being those devoted to the sign and to the binary digit of the higher weight.

The device is also remarkable by the fact that it comprises a system for inverting, upon control by a micro-instruction, the output order of a predetermined number of binary digits contained in a sequential series of binary elements of the adder.

This last feature is particularly advantageous for the sequence restoration of a certain number of samples of an analyzed signal during operations concerning the fast Fourier transform (FFT) as it is well known in the art. This sequence restoration is usually carried out by shifting the binary numbers corresponding to the adresses of the samples to a memory, towards the binary elements of low weight of a register and by introducing the so-shifted number at the input of low weight of a second register. The following shiftings and the successive tests to be carried out require a great number of micro-instructions and make use of the control members during a great number of successive cycles.

The inverting system has for object, as more precisely explained hereinafter, to speed up the phase of sequence restoration of the samples.

Figure 2:
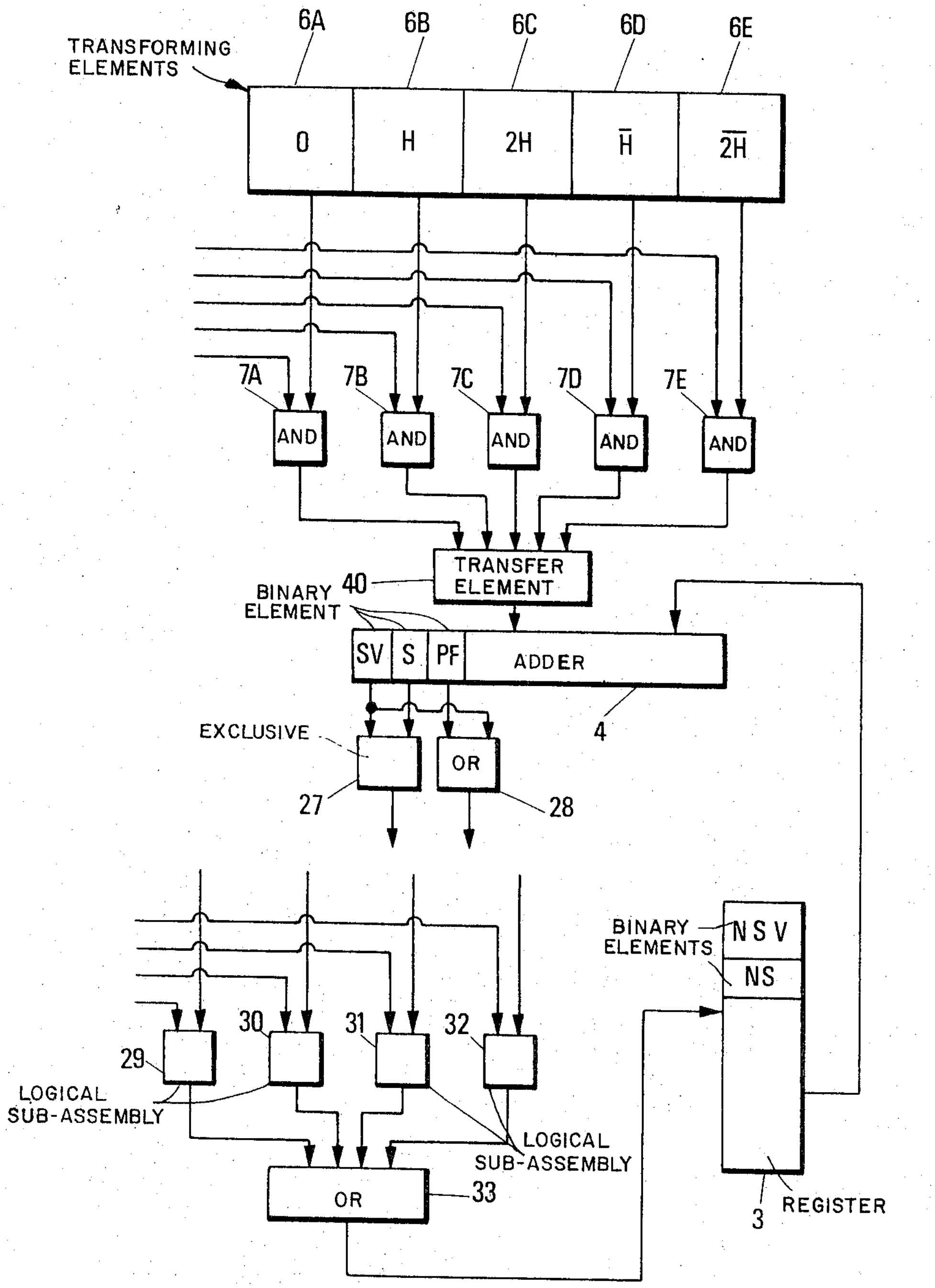
Figure 3:
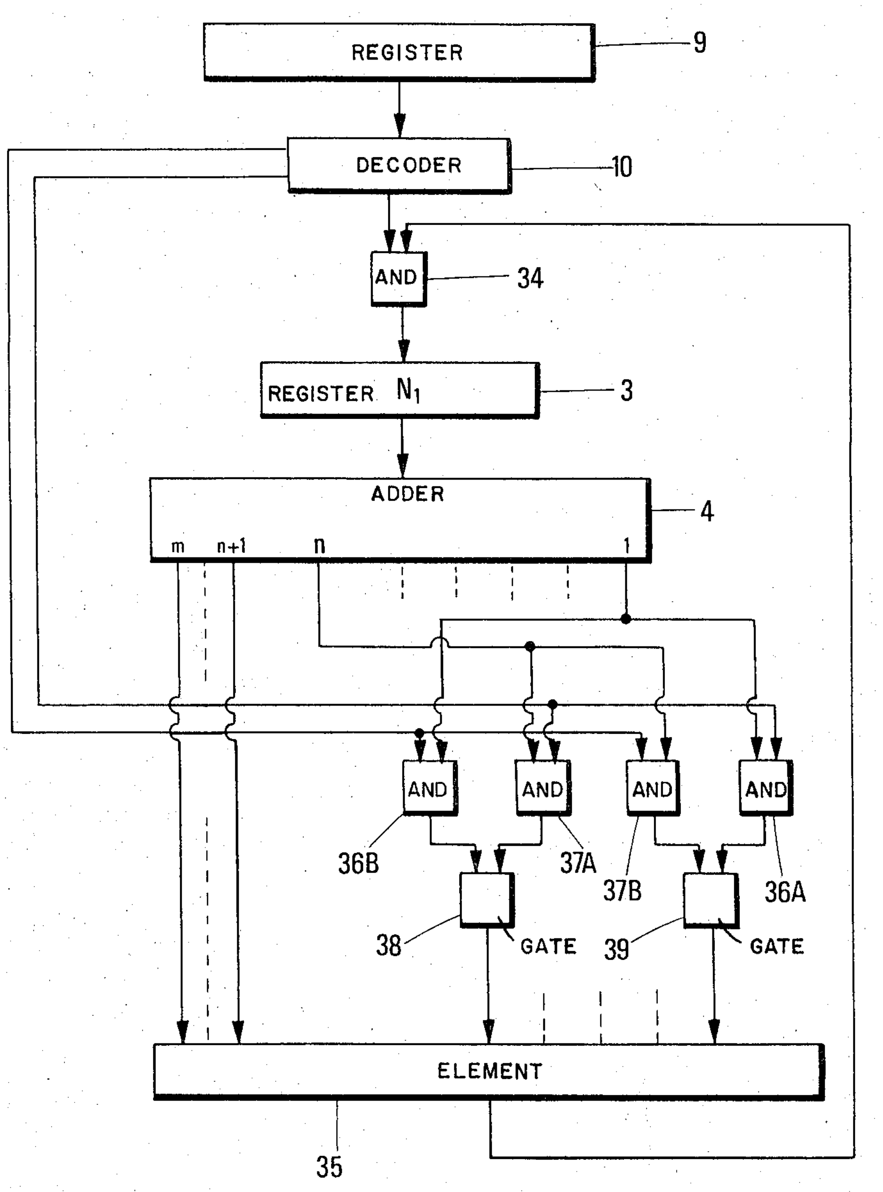

Other features and advantages will be made apparent from the following description with reference to the accompanying drawings illustrating non-limitative embodiments of the device. In these drawings:

FIG. 1 diagrammatically shows the different constituting elements of the device, FIG. 2 shows diagrammatically the connecting between the systems associated to one of the registers and to the adder whereby it is possible to keep the signs of one operand and of a partial sum as well as the test and normalization system, and FIG. 3 diagrammatically shows the system performing the inversion of the order of the binary digits contained in a series of successive binary elements of the adder.

The device diagrammatically shown in FIG. 1 comprises three registers 1, 2 and 3, each having a number of binary elements adapted to that of the operands to be processed and an adder 4. The register 1 is connected to five elements 6A, 6B, 6C, 6D and 6E, which perform elementary transformations from the binary number contained therein. This binary number being called H, the elements 6A, 6B, 6C, 6D and 6E, respectively produce the binary numbers 0, H, $\bar{H}$ and $2\bar{H}$, these two last numbers being respectively the conjugated values of H and 2H. The elements 6A, . . . 6E are respectively connected to five logical gates of the AND type 7A, 7B, 7C, 7D and 7E. The output terminals of these gates are all connected to the input terminals of the adder through an OR gate 40. The output terminals of gates 7D and 7E, which respectively produce signals $\bar{H}$ and $2\bar{H}$, are also connected to the "carry over" input gate RE of the adder 4 through an OR gate 8. The input terminals of the adder are also connected to the output terminals of register 3.

The device also comprises a control member consisting essentially of a register 9 in which are successively transferred the orders relating to the operation of the device according to the invention and issued from a micro-instruction memory, not shown, and of a member 10 for decoding said micro-instructions.

It also comprises a flip-flop circuit 11 having one input terminal connected to the output terminal of the decoding element 10 and the other input terminal T connected to a member for testing its state (not shown).

It also comprises four AND gates 12A, 12B, 12C and 12D having an input terminal connected to the decoding element 10 and another input terminal connected to the output terminal reference $\overline{MT}$ of flip-flop 11. The output terminals of gates 12A, 12B, and 12C are respectively connected to the input terminals of three Or gates 13A, 13B and 13C. The output terminals of the latter are respectively connected to the input control terminals of the three AND gates 7A, 7B and 7D. It further comprises five AND gates 14A, 14B, 14C, 14D and 14E, each having an input terminal connected to the output terminal referenced MT of the flip-flop 11. The output terminals of gates 14A and 14B are respectively connected to the input control terminals of the AND gates 7E and 7C. The output terminals of gates 14C, 14D and 14E are respectively connected to an input control terminal of the AND gates 13A, 13B and 13C. Finally, the output terminal of the AND gate 12D is connected to the input terminal of the OR gate 8.

The device further comprises a counter 15 having an input terminal connected to the output terminal referenced MT of the flip-flop 11 through an AND gate 16. It further includes a comparator 17 having an input terminal connected to the output terminal of counter 15 and an output terminal connected, on the one hand, to an input terminal RAZ of the flip-flop 11 for resetting the latter to zero and, on the other hand, to an element 18, which, upon actuation, produces a signal for setting in the counter 15 a predetermined value. An input terminal of the AND gate 16 is connected to a member, not shown, issuing a periodical signal HL defining a time base.

The register 2 of the multiplier comprises an "extension" flip-flop circuit EM 5. It provides for the memorization of the low weight binary element of register 2 when the binary number contained therein is shifted towards the low weights.

The device also comprises a decoding member 19 whose input terminals are connected to the output terminals of two binary elements of low weight of the register 2 and to the output terminals of the extension flip-flop 5. The output terminals of said decoding member 19 are connected to the input terminals of the AND gates 14A, 14B, 14C, 14D and 14E. The output terminals of the adder, as well as those of register 2, are connected to the input terminals of a shifting element 20 which performs the shifting towards the binary elements of low or high weight. The output of the shifting element 20 is connected to registers 3 and 2 and to the extension flip-flop 5 through logical systems respectively 21, 22 and 23 ensuring the distribution of the shifted operand and partial result to the respective binary elements of these registers.

The output terminal of the AND gate 16 is connected to the input terminals "time base" of registers 2 and 3 and to the extension flip-flop 5 through control OR gates respectively 24, 25 and 26.

The device works as follows:

In the case when the fraction of micro-instruction transferred to the register 9 comprises the order of multiplying two operands, the multiplicand is transferred to the register 1 and the multiplier to the register 2. The decoding element 10 then produces a signal RA 1 which places the flip-flop 11 in a corresponding state. The signal produced at the output MT of the flip-flop initiates the opening of gates 14A, 14B, 14C, 14D and 14E and the conjugated signal, produced at the output $\overline{MT}$ of said flip-flop, locks the gates 12A, 12B, 12C and 12D. By this way, the flip-flop 11 validates the orders emanating from the decoding member 19 and inhibates the orders emanating from the micro-instruction when the multiplying order has been issued.

In autonomous working conditions, the device is operated in accordance with the Booth's algorithm, which is well known in the art. The conventional method consists in carrying out a series of cycles of additions and shiftings upon control of a micro-program. The multiplication of two numbers of $n$ binary elements requires n cycles of at least two micro-instructions i.e. $2n$ cycles and in addition a sign correction.

The Booth's method provides for the division by two of the number of successive cycles and makes unnecessary the sign correction. It consists in testing two by two the binary elements of the multiplier and in determining the following operation which must be carried out on the successive partial results, according to the result of the test.

The extension flip-flop 5 memorizes the binary element of low weight of the register 2 when its content has been shifted toward the binary elements of low weight. The decoding member 19 generates, in response to the state of the two binary elements $M_{n-2}$ and $M_{n-1}$ of the lower weight of the register and to the state of the flip-flop EM, the following orders:

| $M_{n-2}$ | $M_{n-1}$ | EM | Order |
|---|---|---|---|
| 0 | 0 | 0 | 0 |
| 0 | 0 | 1 | +M |
| 0 | 1 | 0 | +M |
| 0 | 1 | 1 | +2M |
| 1 | 0 | 0 | −2M |
| 1 | 0 | 1 | −M |
| 1 | 1 | 0 | −M |
| 1 | 1 | 1 | 0 |

±M and ±2M respectively meaning "add or subtract the multiplicand" and "add or substract twice the multiplicand" and 0 meaning "add zero." The orders 0, +M and 2M generated by the decoding member 19 respectively unlock the gates 7A, 7B and 7C through the gates 14C, 14D and 14B and the OR gates 13A and 13B and provide for the transfer of numbers 0, H and 2H from elements 6A, 6B and 6C to the adder inputs. The orders –M and –2M unlock the gates 7D and 7E and provide for the transfer of numbers $\bar{H}$ and $2\bar{H}$ to the adder 4. As the binary numbers –M and –2M are represented in the form of the "2's complement mode" of numbers M and 2M, they are generated from $\bar{H}$ and $2\bar{H}$ by sending a signal +1 on the "carry over" input of the added through gate 8.

The successive operating cycles being at an initial time where, in accordance with the micro-instruction decoded in the decoding member 10 the multiplicand and the multiplier are respectively transferred to the register 1 and 2, the register 3 and the extension flip-flop 8 are reset to 0 and where a predetermined number Co is introduced in the counter 15.

At the beginning of each cycle, the number contained in the register 3 is tested and, according to the result of the test, one of the numbers 0, H, 2H, $\bar{H}$ or $2\bar{H}$, are transferred to the adder which makes the sum thereof. The binary elements of low weights of the multiplier being tested two by two as well as the additional element 5 which contains a binary digit already tested during the preceding operating cycle, the partial result of the addition carried out during the same cycle is transferred to the register 3 and the part of the result exceeding the capacity thereof is transferred to register 2. This transfer is carried out upon a control by logical elements 21, 22 and 23 after shifting by two rows of the content of the adder and that of register 2 by means of the shifting element 20. Due to the successive shiftings, all the binary elements of the multiplier are successively on the two rows of low weights of register 2 and on the extension flip-flop 5 and are tested by the decoding member 19 which determines at each cycle the term to be added to the high weight portion of the partial result contained in register 3.

By means of the element 18, a value Co is introduced in the counter 15 at starting time. When the gate 16 is opened by the signal MT, the pulses HL of the time base will add to the counter 15 one unit at each cycle. At the end of a given number of cycles depending of the number of binary elements of the operands, the number contained in in the counter 15 reaches a predetermined value C. When the difference C – Co corresponds to a determined number $m$, the multiplication of the two operands is complete and the comparator 17 generates a pulse which actuates the flip-flop circuit 11 on its input terminal RAZ. At each cycle the state of the flip-flop 11 may be tested so as to follow the evolution of the series of adding operations and of shiftings initiated by the micro-instructions. By this way, the time at which the flip-flop changes its state, in response to the signal RAZ is determined. The signal MT which is then issued by the flip-flop 11 closes the AND gates 14A, 14B, 14C, 14D and 14E and the signal $\overline{MT}$, conjugates of the signal MT, opens the AND gates 12A, 12B, 12C and 12D. As a result thereof, the decoding member is inhibited and the device is again actuated under direct control of the micro-instruction program.

The device may also be operated in a non-autonomous manner for division operations performed on two operands and under conyrol of a micro-instruction. In this case, the dividend is placed in the registers 3 and 2 and the divider in the register 1. The division is carried out by addition or subtraction of the divider from the dividend, test of the sign of the partial result and shifting towards the binary elements of high weight of that partial result.

The device may perform other operations carrying on two operands when it is under control of micro-instructions i.e. when the gates 14A . . . 14E are inhibited and when the gates 12A . . . 12D are open. It may perform additions, subtractions, extraction of square roots, divisions, etc... In one of these cases for example, the operands are placed in registers 1 and 3 which are connected to the input terminals of the adder. Through the intermediary of the AND gate 12D and the AND gate 8, the decoding element 10 may control the introduction of any carry over on the "RE" input of the adder.

It has been mentioned that, under self-operating conditions, the shifting element 20 provided for a shifting by two rows. This element is also capable of shifting by one row towards the rows of high weight or low weight of the number formed by the content of the adder 4, followed by the content of register 2, before its transfer to the two associated registers 3 and 2 upon control of element 10 for decoding the micro-instructions.

Other particular features of the device are provided for avoiding losses of a portion of the information contained in register 3 and adder 4 and for simplifying the micro-programmation.

With reference to FIG. 2, it is apparent, with more details, that the logical assembly 22 of FIG. 1, connecting the shifting element 20 to register 3, consists of four sub-assemblies 29, 30, 31 and 32, and of one OR gate 33. The sub-assembly 29 provides for introducing in register 3 of information issued from elements external to the device, which are not shown. The sub-assemblies 30, 31 and 32 are respectively connected to the output terminals of the shifting element 20, producing numbers respectively shifted by one row towards the binary elements of high weight and by one or two rows towards the binary elements of low weight.

The adder 4 and the register 3, comprise in a known manner, one binary element devoted to the sign. One particular feature of the device consists in the fact that said adder and said register are each provided with one additional binary element, respectively SV and NSV. The sub-assemblies 30, on the one hand, and 31 and 32, on the other hand, respectively transmit the signal delivered by the binary element 5 and the signal delivered by the binary element SV of the adder, and the element NSV.

These additional binary elements SV and NSV have many functions:

a. If the multiplicand comprises m binary digits and if one of the cycles of a multiplication requires the addition or the subtraction to a partial result of a binary number equal to twice the multiplicand, the binary element SV provides for the introduction of this number in the adder which thus includes $m + 1$ binary elements. The sub-assemblies 30 and 31 are so arranged as to introduce in the element NSV the signal issued from element SV of the adder 4. It has been checked that, in such a case, the sign of the partial result is kept.

b. In a division, the dividend is placed in registers 2 and 3 and the divider in register 1. The division consists of adding or subtracting the divider from the dividend and comprises the sign test of the partial result and the shifting by one row towards the binary elements of high weight of the partial result. The element 30 is so arranged as to transfer to element NSV the signal issued from element S of the adder 4. It has been checked that the binary element NSV of register 2 keeps the sign of the dividend during the initial shift and the binary element SV of the adder keeps the correct sign of the partial first remainder.

c. If one operation is carried out which consists of adding two numbers of *m* binary digits in an adder with m binary elements, the use of element SV avoids the sign loss in the case where the binary number contained in the adder exceeds the capacity of the latter. Two numbers A and B being respectively introduced into the registers 1 and 3, the binary elements NS and NSV are so connected as to produce the same binary digit.

On the other hand, the element 40 is connected to the adder 4, in such a way that the binary digit indicating the sign of number A issued from element 6B be transferred to the binary element SV. It has been checked that, at the corresponding output of the adder, the actual sign of the addition is kept.

In the case of a subtraction, the binary digit indicating the sign, issued from element 6D, is that transferred to element SV.

Another advantage of the two additional binary elements NSV and SV forming part of the register 3 and the adder and of the hereabove defined connections is made apparent during a shifting operation. When the signals at the outputs of the adder and at those of the element SV are transferred to the register 3 and to the element NSV, after a shifting towards the binary elements of high weight, it has been checked that the sign of the number transferred is kept and that it is possible to keep it by a shifting towards the binary elements of low weight. It has also been checked that, in the case where the transferred number is shifted towards the binary elements of low weight, the actual sign contained in the binary element SV of the adder is transferred to the binary element NS of sign, of register 3. There can be thus obtained the half sum of two numbers even if the number corresponding to their sum exceeds the capacity of the adder.

The device is also provided with a system for checking whether the number contained in the adder exceeds the capacity of the latter.

For this purpose, the outputs of elements SV and S of the adder 4 are connected to the input terminals of a gate 27 of the OR exclusive type. It can be easily checked that the number only exceeds the capacity of the adder when the binary digits contained in these elements are different and accordingly when the gate 27 produces an output signal.

The device further comprises a normalization test system consisting of a gate 28 of the exclusive OR type at the input terminals of which are connected the outputs of the binary element SV and those of the binary element of high weight PF of the adder 4. During normalization of the mantissa of a floating point number, these are carried out successive shiftings of the number contained in the adder towards the binary element of high weight until the binary digits contained in the elements SV and PF be different. This condition will be detected by the signal produced in this case by gate 28.

The computations relating to the fast Fourier transform (FFT) require the sequence restoration of the samples of the signal to be analyzed. This sequence restoration is carried out according to the method of Cooley-Tuckey, well known in the art, and comprises a set of permutations of the addresses of the samples in the memory. The addresses permutations required by this method are facilitated by the use of a system connected to the output terminals of the adder. It results, in the case of m binary digits, in the inversion two by two of the n binary digits of low weight of said number, which respectively correspond to the addresses of the samples to be inverted. The system shown in FIG. 3 is adapted to carry out this operation by an arrangement of wired elements and upon control of a micro-instruction.

The register 9 containing the successive micro-instructions is connecting to the decoding element 10. The latter controls an AND gate 34 whose output is connected to register 3. Register 3 is connected to the adder 4. Assuming that *n* is a number of binary digits to be inverted, the outputs $n+1, n+2 \ldots m$ are directly connected to a distributing element 35.

The *n* outputs of low weight of the adder 4 are connected to a distributing system for transferring to element 35 the binary digits contained in the corresponding binary elements, either with their initial weight, or after inversion of their respective weights in the inversion operation. For sake of clarity of the drawing, only the fraction of the distributing system associated to the outputs of weights 1 and *n* have been shown. The output of weight 1 is connected to the input of two AND gates 36A and 36B and the output of weight *n* is connected to the input of two AND gates 37A and 37B. The output terminals of gates 36B and 37A, on the one hand, and the output terminals of gates 37B and 36A, on the other hand, are connected to the element 35 respectively through two gates 38 and 39. The decoding member 10 provides for the transmission of an order for the release of gates 36B and 36A, on the one hand, and gates 37A and 37B, on the other hand, depending on wheter the respective order of the n binary digits of low weight is to be kept or must be inverted. The opening of gate 34 makes it possible to transfer the content of element 35 to the register 3.

Modifications may be made to the above-described device, particularly in the system (15, 17, 18) controlling the number of operating cycles to be carried out during a multiplication. For example, there may be introduced in the counter 15 an initial value $+p$ or $-p$ and the comparator 17 is then used for detecting the return to zero of the counter after the successive operating cycles required for the multiplication.

Other changes may be made to the device without departing from the spirit and scope thereof and such changes and modifications are properly, equitably and intended to be within the full range of equivalence of the following claims.

What we claim is:

1. A device for carrying out arithmetical and logical operations upon control of a microprogram comprising first, second and third registers, adapted to contain operands to be processed, consisting of a series of bits of increasing significance, one additional element for memorizing the least significant bit of the second register, means for simultaneously producing numbers respectively equal to the value of the operand contained in the first register, to its conjugated value, to twice the value of the operand, to the conjugated value of twice the value of the operand and to zero, means for adding two binary numbers, an assembly for decoding the two less significant bits of the second register and the bit contained in the additional element, means for shifting the numbers contained in the adding means and in the second register, means for transmitting these numbers, after shifting thereof, to the third register, the second register and to the additional element, means for decoding microinstructions issued from a microprogram, means for transferring to the adding means one of the numbers produced by the producing means, first means for controlling the transfer of the orders contained in the decoded microinstruction, on the one hand, to the control inputs of the transferring means and on the other hand to the adding means, second means for controlling the transfer of the signals produced by the decoding assembly to the control inputs of the transferring means, means responsive to the decoding means for memorizing an order for multiplying two operands placed in the first and in the second register, said memorizing means being adapted to actuate either the first controlling means or the second controlling means in accordance with the decoded microinstruction relating respectively to a multiplication of the two operands or another operation.

2. A device according to claim 1, wherein the memorizing means comprises a flip-flop circuit having one control input connected to the decoding means, one output connected to the second controlling means and to means for self-operated control of the operating cycles and the other output connected to the first controlling means.

3. A device according to claim 1, wherein the means for self-operated control of the operating cycles comprises a counter, means for introducing in the counter a predetermined initial number and means for comparing the number contained in the counter with a second predetermined number, the difference between these two numbers being equal to the number of successive operating cycles to be carried out, the comparison means producing, at the end of the cycles, a signal for modifying the state of the memorizing means.

4. A device according to claim 1, wherein the shifting means comprises first shifting means for shifting by two rows, towards the less significant binary elements, the numbers contained in the adding means and in the second register, upon control of means for ensuring the self-operated control of the operating cycles and second shifting means for shifting by one row, towards the more or less significant binary elements, the numbers contained in the adding means and the third register upon control of the decoding means.

5. A device according to claim 1, wherein the adding means and the third register each comprise a sign binary element affected to the sign bit, and the adding means and the third register each comprise an additional binary element, and further comprising means for transferring in the additional binary element of the third register the same bit as that contained in the sign binary element of said third register when a binary number is transferred to said register upon a control external to the device, means for transferring to the additional binary element of the third register the bit contained in the sign binary element of the adding means when a shifting of the content from the third register is effected towards the most significant binary elemen5s, and means for transferring to the additional element of the third register the bit contained in the additional binary element of the adding means when a shifting by one or two rows of the number contained in the third register is effected towards the less significant binary elements.

6. A device according to claim 5, comprising means for transferring to the additional binary element of the adding means the bit contained in the additional binary element of the third register and means for transferring to the additional binary element of the adding means the sign bit of the numbers produced by the producing means.

7. A device according to claim 5, comprising a test and normalization system including two gates of the exclusive OR type, each connected to the output terminal of the additional binary element of the adding means, on the one hand, and respectively to the output terminal of the sign binary element and to the binary element assigned to the most significant bit of the adding means, on the other hand.

8. A device according to claim 1, further comprising means for producing in the correct sequence the signals issued from the binary elements of the adding means and means for inverting the sequence of production of a predetermined number n of the signals issued from the successive binary elements assigned to bits of increasing significance.

9. A device for carrying out arithmetical and logical operations upon control of a microprogram comprising an assembly means for conducting multiplication of two operands, means for decoding microinstructions issued from the microprogram, first gate means for controlling the transfer to the assembly means of control signals relating to the operation to be carried out provided by a microinstruction, second gate means for controlling the sequential operations relating to multiplication of the two operands and means responsive to the decoding means, for activating either the second gate means or the first gate means respectively according to whether the decoded microinstruction relates to a multiplication of the two operands or another operation.

10. A device for carrying out arithmetical and logical operations upon control of a microprogram comprising means for decoding microinstructions issued from the microprogram, a multiplier means including register means for storing two operands and a partial product of said operands, means for generating different multiples of a first operand, adding means, means for transferring selected multiples of the first operand into the adding means upon control of the decoding means, means for decoding the three less significant bits of the second operand, means for shifting in the register means the numbers corresponding to the second operand and partial products of said operands, counter means for controlling the number of operating cycles of the multiplication, first gate means for controlling the transfer to the multiplier means of control signals relating to the operation to be carried out and provided by the microinstruction, second gate means for controlling the sequential operations relating to multiplication of the two operands and means including a bistable flip-flop for controlling automatic processing of successive cycles of operations when the decoded microinstruction involves a multiplication of two operands, said automatic processing means being initiated by the means for decoding microinstructions.

11. A device according to claim 10, wherein the register means comprise a register for a multiplier and wherein the adding means and said register comprise each on the one hand a sign binary element affected to the sign bit, and on the other hand an additional binary element, further comprising means for transferring in the additional binary element of said register means the same bit as that contained in the sign binary element of said register means when a binary number is transferred to said register means upon a control external to the device, means for transferring to the additional binary element of said register the bit contained in the sign binary element of the adding means when a shifting of the content from said register is effected towards the most significant bits, and means for transferring to the additional element of said register the bit contained in the additional binary element of the adding means when a shifting by one or two rows of the number contained in said register is effected towards the less significant bits.

12. A device according to claim 11, comprising means for transferring to the additional binary element of the adding means the bit contained in the additional binary element of said register and means for transferring to the additional binary element of the adding means the sign bit of the numbers produced by the means for generating different multiples of the first operand.

13. A device according to claim 11, comprising a test and normalization system including two gates of the exclusive OR type, each connected to the output terminal of the additional binary element of the adding means, on the one hand, and respectively to the output terminal of the sign binary element and to the binary element assigned to the most significant bit of the adding means, on the other hand.

14. A device according to claim 10, further comprising means for producing in the correct sequence the signals issued from the binary elements of the adding means and means for inverting the sequence of production of a predetermined number n of the signals issued from the successive binary elements assigned to bits of increasing significance.

15. A device for carrying out arithmetical and logical operations upon control of a microprogram comprising an assembly including adding means for conducting multiplication of two operands transferred into register means, means for decoding microinstructions issued from the microprogram, first gate means for controlling the transfer to the assembly of control signals relating to the operation to be carried out provided by the microinstruction, second gate means for controlling the sequential operations relating to multiplication of the two operands and means initiated by the decoding means for activating either the second gate means or the first gate means respectively according as the decoded microinstruction relates to a multiplication of the two operands or another operation, wherein the register means included a register for a multiplier and wherein the adding means and said register comprise each on the one hand a sign binary element affected to the sign bit, and on the other hand an additional binary element, further comprising means for transferring to the additional binary element of said register the same bit as that contained in the sign binary element of said register when a binary number is transferred to said register upon a control external to the device, means for transferring to the additional binary element of said register the bit contained in the sign binary element of the adding means when a shifting of the content from said register is effected towards the most significant bits, and means for transferring to the additional element of said register the bit contained in the additional binary element of the adding means when a shifting by one or two rows of the number contained in said register is effected towards the less significant binary elements.

16. A device according to claim 15, wherein said assembly comprises means for generating different multiples of a multiplicand comprising means for transferring to the additional binary element of the adding means the bit contained in the additional binary element of said register and means for transferring to the additional binary element of the adding means the sign bit of the numbers produced by the means for generating different multiples of the multiplicand.

17. A device according to claim 15, comprising a test and normalization system including two gates of the exclusive OR type, each connected to the output terminal of the additional binary element of the adding means, on the one hand, and respectively to the output terminal of the sign binary element and to the binary element assigned to the most significant bit of the addition means, on the other hand.

18. A device according to claim 15, further comprising means for producing in the correct sequence the signals issued from the binary elements of the adding means and means for inverting the sequence of production of a predetermined number n of the signals issued from the successive binary elements assigned to bits of increasing significance.

* * * * *